Nov. 28, 1933.　　　　　F. B. FOSTER　　　　　1,936,712
MAGNIFYING DEVICE
Filed March 9, 1931　　　　2 Sheets-Sheet 1
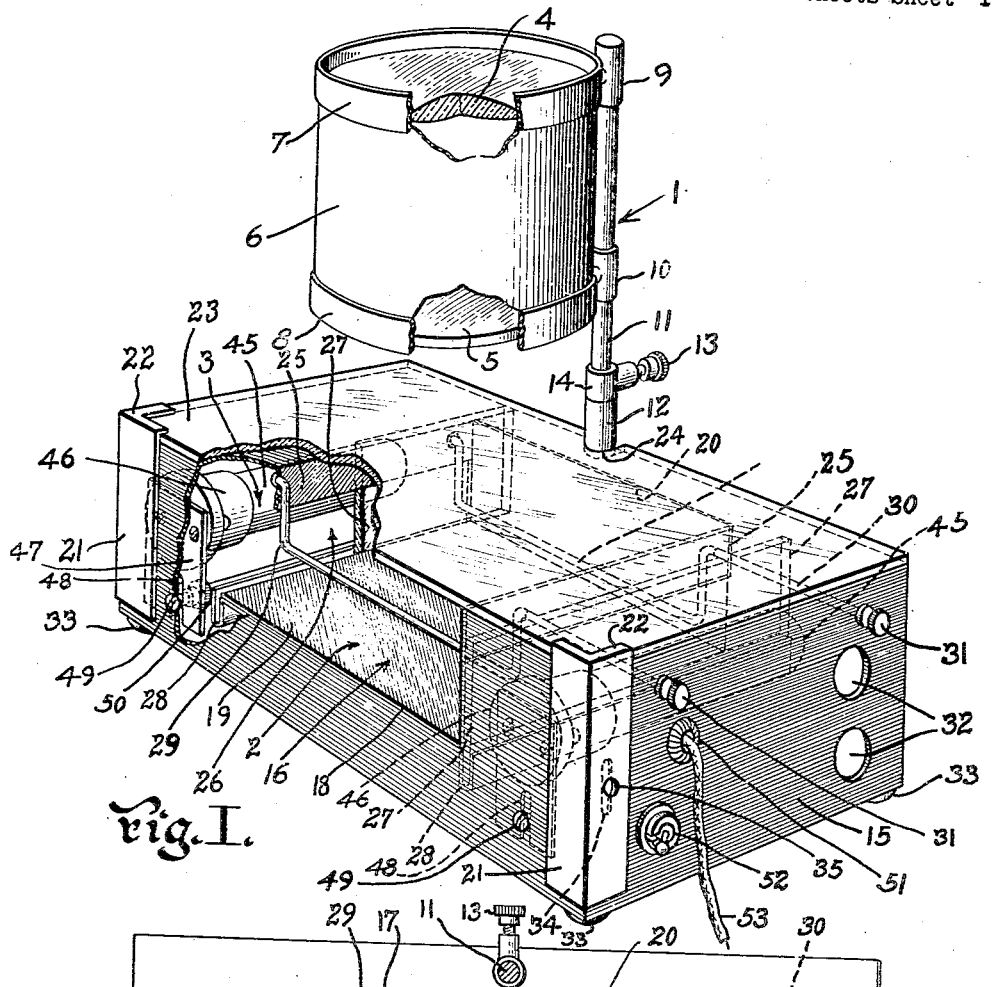

Nov. 28, 1933.   F. B. FOSTER   1,936,712
MAGNIFYING DEVICE
Filed March 9, 1931   2 Sheets-Sheet 2
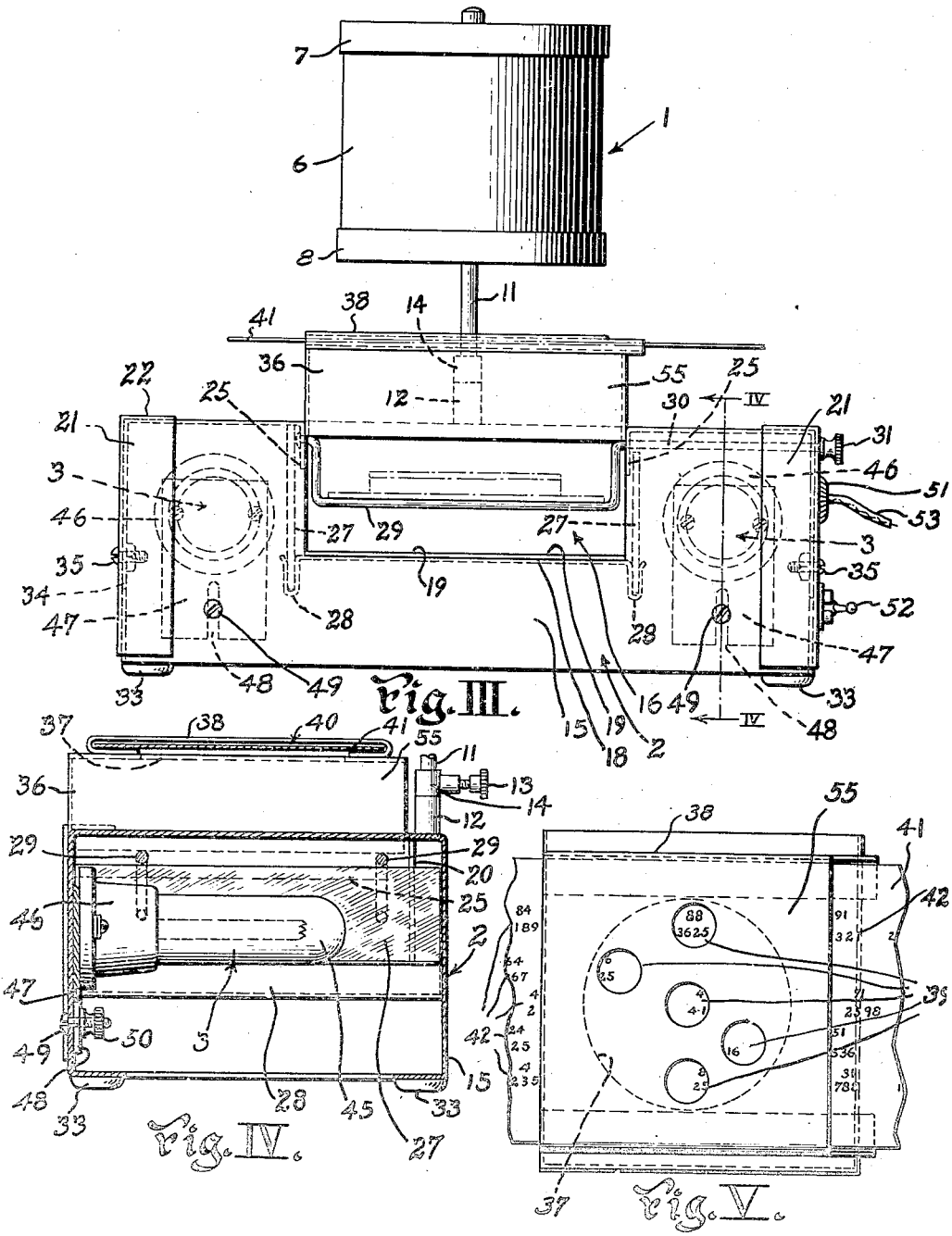

Patented Nov. 28, 1933

1,936,712

UNITED STATES PATENT OFFICE

1,936,712

MAGNIFYING DEVICE

Frank Barnes Foster, Yonkers, N. Y.

Application March 9, 1931. Serial No. 521,100

15 Claims. (Cl. 88—39)

This invention relates to improvements in magnifying devices and more particularly to a combined magnifying device and illuminated object staging and support therefor and to an improved process of inspection under magnification.

One of the principal objects of the invention is to provide improved means and an improved process for counting colonies or cultures in milk.

Another object of the invention is to provide improved means and an improved process for inspection under magnification in biological and pathological laboratories, colleges, etc.

Another object of the invention is to provide improved means and an improved process for inspection under magnification of multiple columns of figures, printed matter and similar objects, such as monthly statements, bills, etc.

Another object of the invention is to provide a simple, efficient and inexpensive staging or support and illumination for a magnifying device.

Other objects of the invention are to provide improved means, for focussing the magnifying lenses, for supporting various objects to be observed, for adjusting the objects to desired position in relation to the lenses and illumination, for providing simple, inexpensive and efficient illumination, for facilitating observation of the objects in routine testing and observation, and for keeping the device in a clean and sanitary condition.

Other objects and advantages of the invention will become apparent from the following description taken in connection with the accompanying drawings. It will be apparent that many changes may be made in the arrangement of parts and details of construction and in the steps of the process without departing from the spirit of the invention as expressed in the accompanying claims. I, therefore, do not wish to be limited to the exact arrangements and steps shown and described as the preferred forms only have been shown by way of illustration.

Referring to the drawings:

Fig. I is a perspective view of a device embodying the invention;

Fig. II is a top plan view of Fig. I with the lens support shown in cross section;

Fig. III is a front elevation of the device shown in Fig. I;

Fig. IV is a cross section on line IV—IV of Fig. III, and

Fig. V is a partial top plan view of Fig. III showing a removable object support and a legend strip in fixed relation thereto.

In the arts and sciences there has been felt an urgent need for a magnifying device that would lend itself readily to the various requirements of rapid routine inspection and particularly for such a device wherein various forms of matter whether solid or of a pasty messy nature could be readily supported in test position and readily positioned in the proper test relation to the lenses and illumination, etc. There are a multiplicity of uses to which such a device would lend itself both in the business and scientific world. It is therefore among the prime objects of my invention to provide such a device and an improved process of inspection wherein the operation will be rapid and facile and the highest cleanliness and sanitation be maintained in a simple and inexpensive construction.

Referring to the drawings wherein like characters denote corresponding parts throughout:— the device may be divided broadly into three component parts, namely, 1, the lens unit, 2, the staging or support and 3, the illumination.

The lens unit comprises the lenses 4 and 5, which as shown are two biconvex magnifying lenses. These lenses may be plano-convex or of other curvature according to the power desired and there may be used a single lens or multiple lenses or compound lenses as desired or required. These lenses 4 and 5 are held in related position in the cylindrical casing 6 having the lens holding rims 7 and 8. The lenses are preferably held at a fixed distance apart although they may be movably or slidably mounted in the casing 6 if desired. Secured to the casing 6 or the rims 7 and 8 are the lugs 9 and 10 in which is secured the supporting stem 11 preferably a smooth metal rod. The stem 11 telescopically and rotatably fits in the socket 12 which is secured to the casing of the staging. The stem 11 is locked against movement in the socket 12 by means of the thumb screw 13. The casing 6 with the lenses may be raised or lowered with respect to the staging by raising or lowering the stem 11 in the socket 12, and may be rotated over the staging on the stem 11 as an axis in the socket 12. The rod or stem 11 is provided with a collar 14 which abuts the socket 12 and acts as a stop bearing member.

The staging or object support 2 comprises a bottomless box member 15 having an opening 16 bounded by the lines 17 on the top and extending downwardly to the platform 18, which platform is secured to and supported by the front and back walls of the box member. The platform 18 is covered by a sheet of bakelite or similar material 19. The rear side wall of the opening is also covered by a similar plate 20.

The two front corners of the box are provided with corner angle members 21 flanged over on the top to form retaining clips 22. A plate glass sheet 23 is fitted over the top of the box and is held in place by the clips 22. The sheet or plate 23 is removable being slidably slipped in place under the clips 22. The plate 23 is notched at 24 to clear the socket 12. The sections of the box between the opening 16 and the respective ends of the box are formed into illuminating chambers each chamber having a flange 25 across the end of the opening 16 and extending from the top of the opening downwardly part way to the bottom thereof leaving an opening 26 from the space above the platform 18 into the light chamber. The ends of the opening 16 are closed by glass plates 27 having their upper ends supported by the flanges 25 and the lower ends by the flanged grooves 28 of the platform 18. Rotatably pivoted in the flanges 25 are the crank rods 29 having the extensions 30 extending through the walls of the box and terminating in the thumb nuts 31. The illuminating or light chambers are provided with vent openings 32. Rubber foot pads 33 are provided on the bottom corner to prevent scratching etc. Beneath the corner angles 21 the box member 15 is provided with slots 34 through which the lock bolts 35 extend. By loosening the bolts 35 the angled members 21 may be slipped up or down to accommodate the thickness of the glass plate 23 on top of the box and then secured in place by tightening the bolts 35. If desired to facilitate speed of testing, the space occupied by the plate 20 in the rear wall of the opening 16 may be left unenclosed and a corresponding opening be made through the rear wall of the box thus allowing access to the space 16 from either front or back of the box.

A secondary staging or platform 55 is provided for holding sheet, legend or manuscript test objects. The platform 55 comprises an open bottom box member 36 shaped and adapted to fit in the opening 16 with its bottom edges resting on the crank rods 29. The front side of the box 36 may be left out. The circular or other shaped opening 37 is cut out of the top of the box member 36. Above the top of the box member 36 is the guide plate member 38 having the openings 39 and a guide space 40 between the member 38 and the top of the box member 36. Slidable in the guide space 40 is the legend sheet 41 having the legend 42 thereon. As shown the legend sheet has five rows of legends one above the other. The openings 39 correspond in number to the rows of the legend and are so arranged that when a complete legend unit appears in one opening none of the other openings will show a complete legend unit. In this way the legend sheet may be inspected row by row one unit at a time without confusion and as the last legend read is the only one which appears in one of the openings, it allows intermittent inspection and allows the operator to be called away without loosing count on resuming the count etc. This method of inspection is particularly adaptable to the photostat statement films used by telephone companies. This secondary staging is adaptable to many forms of legend inspection and similar uses.

The illumination comprises the electric lamps 45 in each illuminating chamber. The lamps fit in the sockets 46 which are secured to the slide plates 47 having the slots 48. Into the slots 48 are fitted the set screws 49 having the nuts 50 on the inside of the light chamber. The plates 47 may be slid up and down to desired position by loosening the screws 49 and then resecured by tightening the same, the screws 49 acting as guides in the slots 48. Suitable insulated electric current wires are led through the box at 51 to the sockets 46 in the usual way. The wires 53 are of desirable length and may be fitted with plugs, not shown, for fitting into a source of electrical current in the usual way. An on and off switch 52 is provided for turning on and off the current to the two lamps. The two lamps are so connected by the wires 53, that a single switch will operate them both.

The operation of the device is as follows:

The lenses are raised and lowered on the stem 11 in the socket 12 and secured in position by the thumb screw 13. The lenses are swung over the opening 16 by rotating the stem 11 axially in the socket 12 and secured in desired position by the thumb screw 13. As shown the two lenses travel together as a unit.

For observing messy pasty substances the glass top 23 may be utilized, the object being placed under the lenses thereon. The glass top 23 may be used and the platform plate 19 used in a similar way. The crank rods 29 may be adjusted to desired height by the thumb screws 31 and a glass platform rested thereon and the object be placed on this platform. It is clear that the rods 29 may be adjusted to any desired height in their range of travel. The secondary staging 55 may be inserted in the opening 16 to rest on the rods 29 and the legend sheet passed through the guide space 40 thereof as has been described. The object held in any of these positions may be inspected through the lenses after they have been focussed and positioned as described. Illumination is supplied by the lamps 45 the light coming through the openings 26 into the opening 16. The lamps may be adjusted and turned on and off as described.

The device lends itself particularly well to the counting of cultures in milk. The rods 29 are adjusted to height; a glass plate is supported by the rods; a glass dish containing milk and gelatin is placed on the plate; a counting chart is placed beneath the dish and the lenses adjusted and the gelatin mixture inspected therethrough and the cultures counted, the chart being divided into suitable spaces to make counting easy. Illumination is supplied by the lamps as described.

The secondary staging 55 is particularly adaptable for inspecting legend sheets particularly where there are multiple legends and multiple rows of legends. The top of the staging 55 having suitable openings for the legends and arranged so that only one row of legends are complete in an opening at a time as has been described. The lenses are adjusted and the illumination supplied as has been described.

From the foregoing it will be seen that I have provided simple, efficient and inexpensive means for carrying out the many advantages of the device and that in particular I have provided new and improved processes for inspecting cultures, legends and the like.

Having described my invention I claim:

1. In a device of the character described, a support having a central recessed portion, a lens system adjustable towards and away from said recess, spaced bearings in the ends of said recess, a pair of rods extending longitudinally of said recess, each rod forming a bell crank arm extending through a respective bearing in the ends of said recess and means to turn the rods whereby they may be made to approach or recede from the lens system, a member having an illuminating chamber communicating with said recess, and a source of illumination in said chamber.

2. In a device of the character described, a box staging having a central recess and light chambers at either end, said light chambers communicating with said recess, a source of light in the light chambers, spaced bearings in the ends of the recess, a pair of rods extending longitudinally of the recess, each of said rods having a bell crank arm extending through a respective bearing in the ends of the recess, a lens system in focal alignment with the recess, and means for turning the rods whereby they may be made to move towards and away from the lens system.

3. In a device of the character described, a box staging having a central recess and light chambers at either end, said light chambers communicating with said recess, a source of light in the light chambers, spaced bearings in the ends of the recess, a pair of rods extending longitudinally of the recess, each of said rods having a bell crank arm extending through a respective bearing in the ends of the recess, a lens system in focal alignment with the recess, means for turning the rods whereby they may be made to move towards or away from the lens system, and means for moving the lens system towards and away from the support.

4. In a device of the character described, a box staging having a recess and a light chamber communicating with the recess, a source of light in the light chamber, a transparent member between the light chamber and the recess, spaced bearings in the ends of the recess, a pair of rods extending longitudinally of the recess, each of said rods having a bell crank arm extending through a respective bearing in the ends of the recess, a lens system in focal alignment with the recess, and means for changing the distance between the lens system and the rods.

5. In a device of the character described, a box member having a recess opening on the front and top thereof and light chambers beyond the ends of the recess, said light chambers communicating with the said recess, spaced bearings in the ends of the recess, a pair of rods extending longitudinally of the recess, each of said rods having a bell crank arm extending through a respective bearing in the ends of the recess, a viewing lens system supported in focal alignment with the recess, light sources in the light chambers and means to rotate the rods to change the distance between them and the lens system.

6. In a device of the character described, a box member having a recess opening on the front and top thereof and light chambers beyond the ends of the recess, said chambers communicating with the said recess, spaced bearings in the ends of the recess, a pair of rods extending longitudinally of the recess, each of said rods having a bell crank arm extending through a respective bearing in the ends of the recess, a transparent plate over the recess and the top of the box, a viewing lens system supported in focal alignment with the recess, light sources in the light chambers and means to rotate the rods to change the distance between them and the lens system.

7. In a device of the character described, a support platform having a recessed portion depending therein, a lens system supported to overlie said recess, spaced bearing supports in the opposite ends of said recess, a pair of rods extending longitudinally of the recess, each of said rods having a bell crank arm extending through respective bearings in the ends of the recess and means to turn the rods whereby they may be made to approach or recede from said lens system.

8. In a device of the character described, a support platform having a recessed portion depending therein, a lens system supported to overlie said recess, spaced bearing supports in the opposite ends of the recess, a pair of rods extending longitudinally of the recess, each of said rods having a bell crank arm extending through respective bearings in the ends of the recess, a second platform supported by the rods, and means to turn the rods whereby the second platform may be made to approach or recede from the lens system.

9. In a device of the character described, a support platform having a recessed portion depending therein, a lens system supported to overlie said recess, means to move the lens system towards or away from the recess, spaced bearing supports in the opposite ends of the said recess, a pair of rods extending longitudinally of the recess, each of said rods having a bell crank arm extending through respective bearings in the ends of the recess and means to turn the rods whereby they may be made to approach or recede from the lens system.

10. In a device of the character described, a support, a stationary guide member on the support and having guides and a cover plate portion with a plurality of openings therein, a carrier member having a plurality of objects arranged thereon in rows, one row for each opening of the cover plate and mounted in the guides of the guide member for longitudinal movement therein under all the openings in the cover simultaneously, the relative position of the cover and the carrier being otherwise fixed, said objects on the carrier being arranged with respect to the openings in the cover so that but one complete object can appear in any one opening at one time and a viewing lens system supported in focal alignment with the said cover portion.

11. In a device of the character described, a support, a stationary guide member on the support and having guides and a cover plate portion with a plurality of openings therein, a carrier member having a plurality of objects arranged thereon in rows, one row for each opening of the cover plate, and mounted in the guides of the guide member for longitudinal movement therein under all the openings in the cover simultaneously, the relative position of the cover and the carrier being otherwise fixed, said objects on the carrier being arranged with respect to the openings in the cover so that but one complete object can appear in any one opening at one time and a viewing lens system supported in focal alignment with the said cover portion, and means associated with the support for illuminating the under side of said carrier.

12. In a device of the character described a box like support and housing member having separated transverse compartments, one at each end, said compartments being higher than the central portion of the box between them, and having means through which light may be transmitted from the compartments to the central space between them and securing means at an outer corner of each end compartment and overlying the top of the compartment, a transparent plate on top of the box, resting on the said end compartments and held in place by the said securing means, illuminating means in each end compartment, aligned with the said light transmitting means and a viewing lens system on the box support in focal alignment with the transparent plate.

13. In a device of the character described, a box like base having separated end compartments, the end compartments being higher than the portion between them, means in the end compartments through which light may be transmitted to the space between the compartments, a bracket plate in each compartment and having a longitudinal slot therein, a securing member extending through the slot, said bracket plate being movable longitudinally and radially about said securing means in the slot, lock means associated with the securing means whereby the bracket plate can be locked against movement on the securing means, a lamp supported by the bracket plate in line with said means through which light may be transmitted to the portion of the base between the end compartments, and lens means supported over the space between said compartments.

14. In a device of the character described, a box like base having separated end compartments, the end compartments being higher than the portion between them, means in the end compartments through which light may be transmitted to the space between the compartments, a bracket plate in each compartment, a securing member associated with the bracket plate whereon the bracket plate may be moved longitudinally and radially, lock means associated with the securing means whereby the bracket plate can be locked against movement on the securing means, a lamp supported by the bracket plate in line with said means through which light may be transmitted to the portion of the base between the compartments, and lens means supported over the space between the said compartments.

15. In a device of the character described, a box like base having separated end compartments, the end compartments being higher than the portion between them, means in the end compartments through which light may be transmitted to the space between the compartments, a bracket plate in each compartment, a securing member associated with the bracket plate whereon the bracket plate may be moved longitudinally and radially, lock means associated with the securing means whereby the bracket plate can be locked against movement on the securing means, a lamp supported by the bracket plate in line with said means through which light may be transmitted to the portion of the base between the compartments, and lens means supported over the space between the said compartments, electric circuit wires coupling the lamps and a switch on the base associated with the circuit wires whereby all the lamps will be lighted or turned off when the switch is in on or off position respectively.

FRANK BARNES FOSTER.